(12) United States Patent
Hotori et al.

(10) Patent No.: US 10,128,721 B2
(45) Date of Patent: Nov. 13, 2018

(54) MOTOR

(71) Applicant: NIDEC CORPORATION, Minami-ku, Kyoto (JP)

(72) Inventors: Tadashi Hotori, Kyoto (JP); Yusuke Yasuda, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 388 days.

(21) Appl. No.: 14/948,858

(22) Filed: Nov. 23, 2015

(65) Prior Publication Data
US 2016/0156246 A1 Jun. 2, 2016

(30) Foreign Application Priority Data
Nov. 28, 2014 (JP) .................................. 2014-242016

(51) Int. Cl.
| | |
|---|---|
| *H02K 5/22* | (2006.01) |
| *H02K 3/50* | (2006.01) |
| *H02K 5/124* | (2006.01) |
| *H02K 11/33* | (2016.01) |

(52) U.S. Cl.
CPC ............. *H02K 5/225* (2013.01); *H02K 5/124* (2013.01); *H02K 11/33* (2016.01); *H02K 2205/09* (2013.01)

(58) Field of Classification Search
CPC ............. H02K 5/225; H02K 3/46; H02K 3/50
USPC .......................................................... 310/71
See application file for complete search history.

(56) References Cited

U.S. PATENT DOCUMENTS

| | | |
|---|---|---|
| 5,485,397 A | 1/1996 | Yamazato et al. |
| 5,555,189 A | 9/1996 | Yamazato et al. |
| 7,573,274 B2 | 8/2009 | Aratani |

(Continued)

FOREIGN PATENT DOCUMENTS

| | | |
|---|---|---|
| JP | H06300432 A | 10/1994 |
| JP | 2001128407 A | 5/2001 |
| JP | 2003061303 A | 2/2003 |

(Continued)

OTHER PUBLICATIONS

English translation of JP 2013211978 A, accessed Feb. 8, 2018 from JPO website <https://www4.j-platpat.inpit.go.jp/cgi-bin/tran_web_cgi_ejje?u=http://www4.j-platpat.inpit.go.jp/eng/translation/20180209061037759180350569232209 53F76D582EC458F8966E1B-291ECEE78118>.*

(Continued)

*Primary Examiner* — Jeremy Luks
(74) *Attorney, Agent, or Firm* — Cantor Colburn LLP

(57) ABSTRACT

A motor may include a motor body portion; a connector portion disposed to the motor body portion; and a wiring member electrically connected to the motor body portion. The connector portion has a surface exposed to an outside of the motor body portion. The wiring member includes a plurality of external connection terminals which are connected to the external power supply to protrude from the exposed surface of the connector part. The connector portion is provided with a through hole which extends from the exposed surface toward the accommodating space and connects the outside of the motor body portion and the accommodating space. When viewed in the normal direction of the exposed surface, at least a portion of the through hole is positioned inside an edge of an external connection terminal group which consists of the plurality of external connection terminals.

9 Claims, 10 Drawing Sheets

(56) References Cited

U.S. PATENT DOCUMENTS

2011/0006625 A1\* 1/2011 Fujii ..................... H02K 3/522
310/71

FOREIGN PATENT DOCUMENTS

| JP | 2008039571 A | 2/2008 |
| JP | 2011179658 A | 9/2011 |
| JP | 2012111333 A | 6/2012 |
| JP | 2013211978 A | 10/2013 |

OTHER PUBLICATIONS

English translation of JP 2001128407 A, accessed Feb. 8, 2018 from JPO website <https://www4.j-platpat.inpit.go.jp/cgi-bin/tran_web_cgi_ejje?u=http://www4.j-platpat.inpit.go.jp/eng/translation/20180209051945430180320046508594 86F76D582EC458F8966E1B-291ECEE78118>.\*

\* cited by examiner

MOTOR

CROSS REFERENCE TO RELATED APPLICATION

The present invention claims priority under 35 U.S.C. § 119 to Japanese Application No. 2014-242016 filed Nov. 28, 2014, the entire content of which is incorporated herein by reference.

FIELD OF THE DISCLOSURE

The present disclosure relates to a motor.

BACKGROUND

In the past, a motor having an air hole, which allows the inside and the outside of a casing body to be communicated with each other through an opening provided to a connector portion, has been known. This motor is provided with a pair of terminals which are exposed inside the connector portion.

The connector portion of the motor described above is provided on the outside of the casing body in many cases. For this reason, sealability between the connector portion and an external power supply, which is connected to the connector portion, is required.

In the motor described above, the connector portion may be formed by using a mold. The mold is provided with, for example, a mold pin for forming the air hole. However, it is difficult to form the mold pin integrally with the mold by machining. Therefore, the mold pin is usually provided as a separate member from a mold body portion. When the mold pin and the mold are separate members, the mold pin may be fixed to the mold body portion by using a method such as welding, or by inserting the mold pin into a concave portion provided to the mold body portion.

When the connector portion of the motor is provided with a plurality of terminals, in most cases, the air hole is provided relatively near an outer edge of the connector portion. When the air hole is provided near the outer edge of the connector portion, a configuration in which the mold pin is inserted into the concave p portion of the mold body portion is usually adopted. In this case, the concave portion needs to be provided near an outer edge of the mold body portion. Accordingly, the thickness of the area of the mold body where the concave portion is provided becomes thinner, which, in turn, may reduce the rigidity of the mold. Therefore, in the mold for forming the connector portion, when the air hole is provided relatively near an outer edge of the connector portion, in most cases, the mold pin is fixed to the mold body portion by welding.

When the mold pin is fixed to the mold body portion by welding, however, unevenness may occur on the mold body portion due to the welded portion. Due to this unevenness formed on the mold body portion, unevenness may also occur on the molded connector portion. Further, there is a possibility that the unevenness may deteriorate the sealability between the connector portion and the external power supply which is connected to the connector portion.

SUMMARY

An embodiment of the present disclosure is a motor which comprises a motor body portion; a connector portion provided to the motor body portion; and a wiring member electrically connected to the motor body portion. The motor body portion includes: a rotor; a stator; a first bearing; a second bearing; and a housing. The rotor includes a shaft having its center on a center axis which extends in one direction. The stator encloses the rotor to rotate the rotor about the center axis. The first bearing is disposed on a first side of the stator in the one direction, and supports the shaft. The second bearing is disposed on a second side of the stator, which is the opposite side from the first side of the stator, and supports the shaft. The housing includes an accommodating space to accommodate the rotor, the stator, the first bearing, and the second bearing. The connector portion has a exposed surface which is exposed to an outside of the motor body portion. The wiring member includes a plurality of external connection terminals which are connected to the external power supply and protrude from the exposed surface of the connector portion. The connector portion is provided with a through hole which extends from the exposed surface toward the accommodating space, and allows the outside of the motor body portion and the accommodating space to be communicated with each other. When viewed in a normal direction of the exposed surface, at least a portion of the through hole is disposed inside an outer edge of an external connection terminal group which consists of the plurality of external connection terminals. The above and other elements, features, steps, characteristics and advantages of the present disclosure will become more apparent from the following detailed description of the preferred embodiments with reference to the attached drawings.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Hereinafter, a motor according to an exemplary embodiment of the present disclosure will be described with reference to the accompanying drawings. Further, the scope of the present disclosure is not limited to the following embodiments, but may be arbitrarily changed within the technical spirit of the present disclosure. Further, to easily understand each component in the following drawings, structures of an actual motor, members, etc., and a scale of each structure, the number of structures, etc., may be different.

Figure 1:
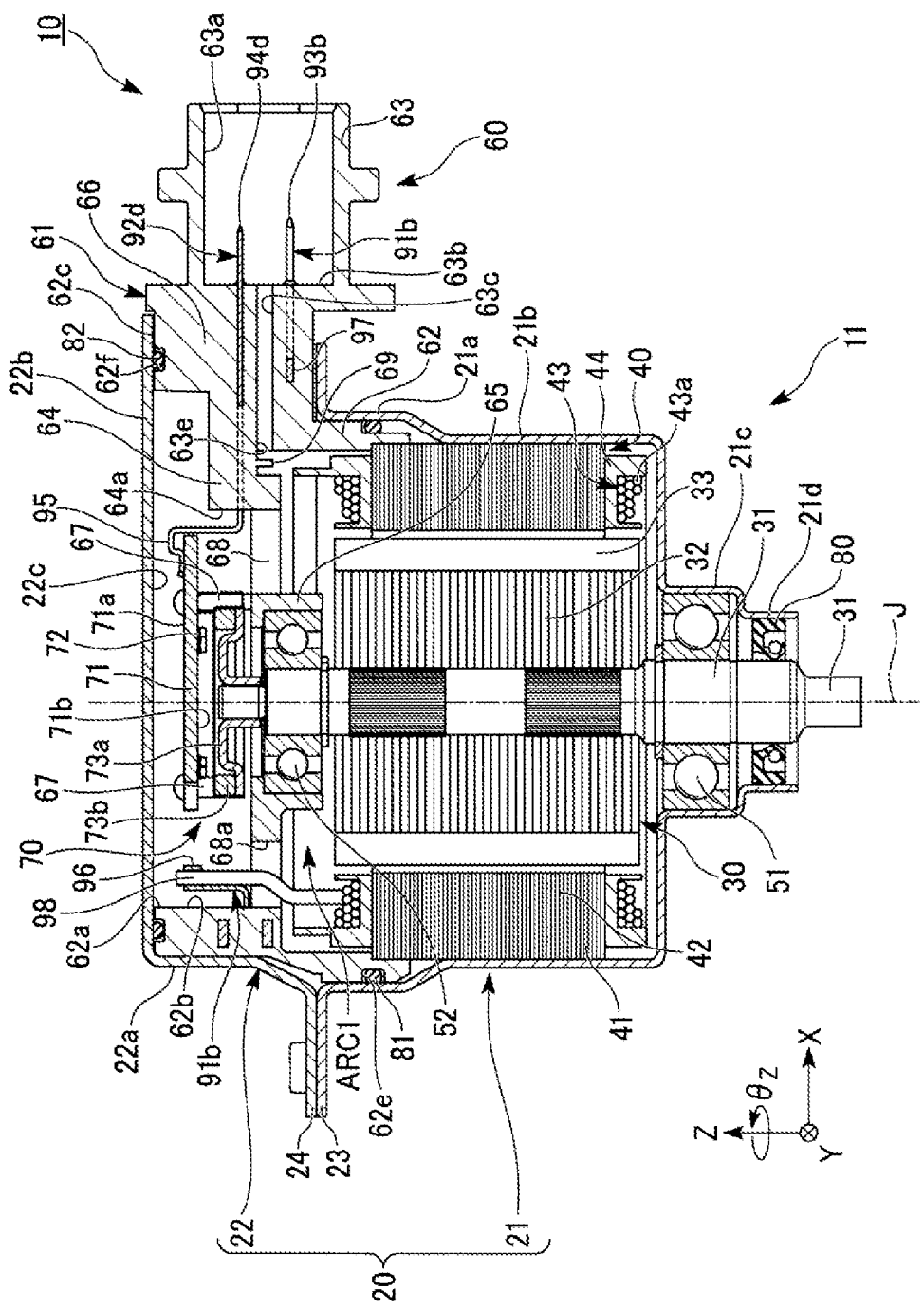
FIG. 1 is a cross-sectional view of a motor according to a first exemplary embodiment of the present disclosure.

In the drawings, an X-Y-Z coordinate system is provided as an appropriate three-dimensional orthogonal coordinate system. In the X-Y-Z coordinate system, a direction parallel to the axial direction (one direction) of a center axis J shown in FIG. 1 is referred to as Z-axis direction. A direction parallel to a length direction of a bus bar assembly 60 shown in FIG. 1, that is, the left-and-right direction of FIG. 1, is referred to as X-axis direction. A direction parallel to a width direction of the bus bar assembly 60, that is, a direction perpendicular to both the X-axis direction and the Z-axis direction, is referred to as Y-axis direction.

In the following description, a positive side of the Z-axis direction (+Z side, a second side) is defined as 'rear side' and a negative side of the Z-axis direction (−Z side, a first side) is defined as 'front side.' It is to be understood that the descriptions of the rear side and the front side are used for explanation only, and they do not limit the actual positional relation or direction. Also, unless otherwise explained, a direction parallel to the center axis J (Z-axis direction) is simply referred to as 'axial direction,' a radial direction having its center on the center axis J is simply referred to as 'radial direction,' and a circumferential direction having its center on the center axis J, that is, the axial circumference of center axis J (θZ direction), is simply referred to as 'circumferential direction.'

Further, herein, descriptions such as being axially extended do not only refer to a case of strictly being extended in the axial direction (Z-axis direction), but it may also include a case of being extended in a direction inclined at less than 45° relative to the axial direction. Also, descriptions such as being radially extended do not only refer to a case of strictly being extended in the radial direction, that is, the direction perpendicular to the axial direction (Z-axis direction), but it may also include a case of being extended in a direction inclined at less than 45° relative to the radial direction.

Figure 2:
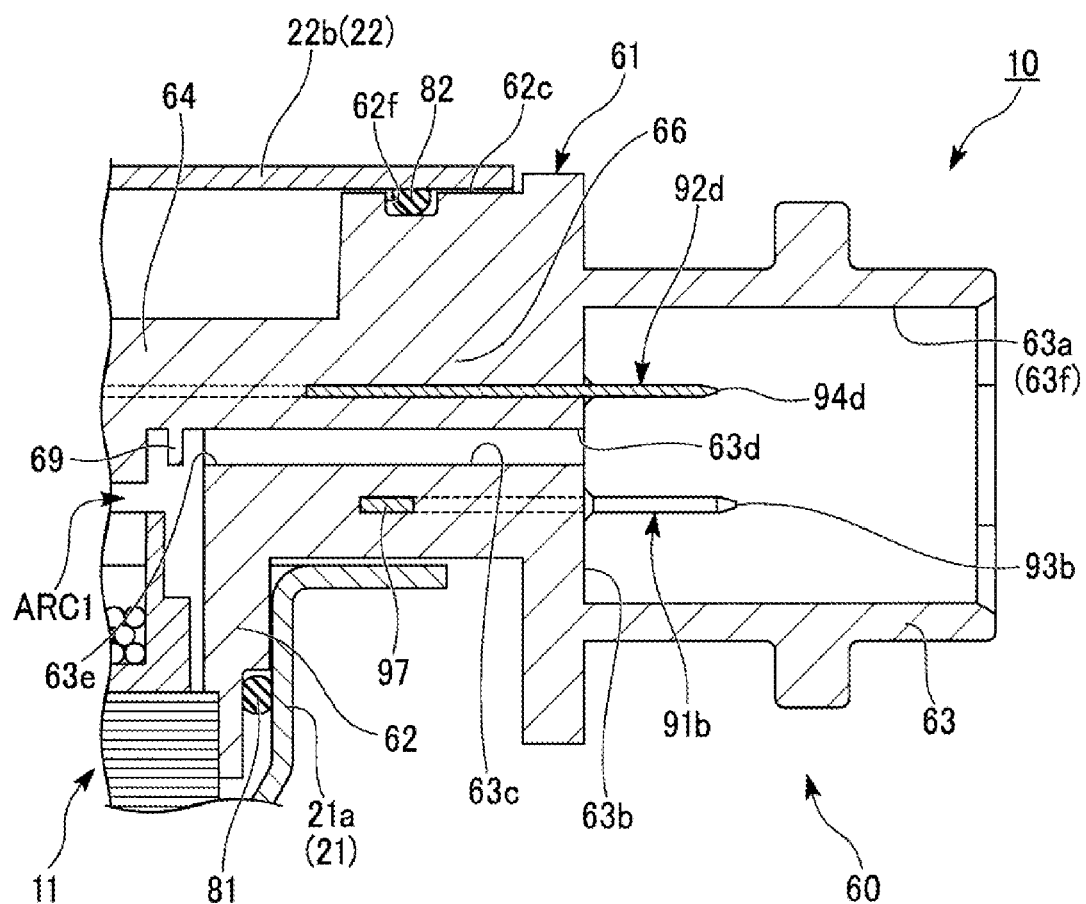
FIG. 2 is a cross-sectional view illustrating a p portion of the motor according to the first exemplary embodiment of the present disclosure.
Figure 3:
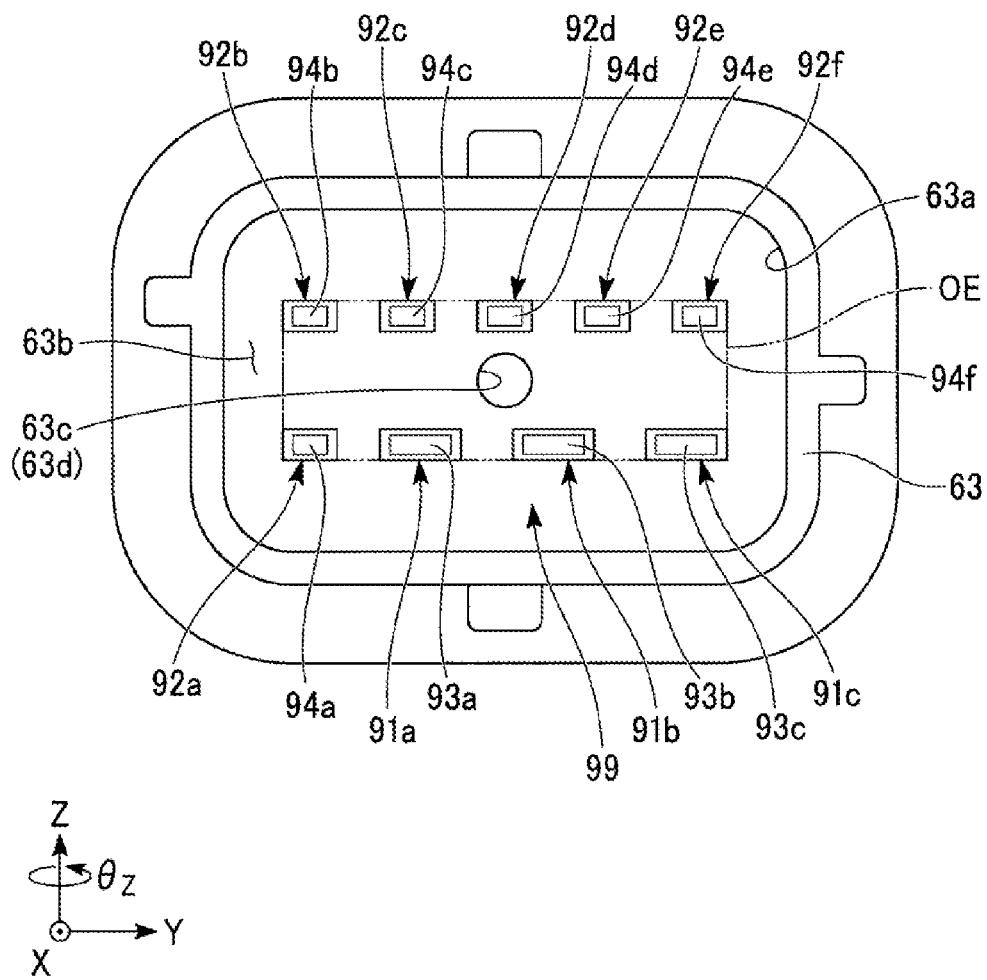
FIG. 3 is a diagram illustrating a connector portion according to the first exemplary embodiment of the present disclosure.

FIG. 1 is a cross-sectional view of a motor 10 according to this embodiment. FIG. 2 illustrates a portion of the motor 10 according to this embodiment and is a partially enlarged cross-sectional view of FIG. 1. FIG. 3 illustrates a connector portion 63 and is viewed from a normal direction (X-axis direction) of a bottom surface 63b of a connector concave portion 63a.

In the following descriptions, unless otherwise explained, the normal direction refers to the normal line (X-axis direction) of the bottom surface 63b.

The motor 10 is a brushless motor. As illustrated in FIG. 1, the motor 10 includes a housing 20, a rotor 30 having a shaft 31, a stator 40, a first bearing 51, a second bearing 52, a control device 70 having a circuit board 71, a bus bar assembly 60, a front side O-ring 81, a rear side O-ring 82, and an oil seal 80. The bus bar assembly 60 preferably has the connector bar 63.

The motor 10 preferably includes a motor body portion 11. The motor body portion 11 has the housing 20, the rotor 30, the stator 40, the first bearing 51, the second bearing 52, the control device 70, the bus bar assembly 60 except for the connector portion 63, the front side O ring 81, the rear side O ring 82, and the oil seal 80. In the following description, in the motor 10, a portion other than the connector portion 63 of the bus bar assembly 60 is referred to as the motor body portion 11.

The housing 20 accommodates each portion of the motor body portion 11. The bus bar assembly 60 is disposed at a rear side (+Z side) of the rotor 30 and the stator 40. In the bus bar assembly 60, the connector portion 63 is exposed outside the housing 20. The bus bar assembly 60 holds the second bearing 52. The housing 20 holds the first bearing 51. Both ends in an axial direction (Z-axis direction) of the shaft 31 are supported by the first bearing 51 and the second bearing 52.

The housing 20 has an accommodating space ARC1. The accommodating space ARC1 accommodates the rotor 30, the stator 40, the first bearing 51, and the second bearing 52. A material of the housing 20 is, for example, metal. The housing 20 has a housing body 21 and a cover 22.

Further, in the following description, 'accommodated in the accommodating space' includes the case in which a target is held inside the accommodating space in the state in which a portion of the target to be accommodated is positioned outside the accommodating space, in addition to the case in which the whole target to be accommodated is positioned inside the accommodating space.

The housing body 21 is a cylindrical member and holds the stator 40 and the first bearing 51. According to this embodiment, the housing body 21 has a multi-stepped cylindrical shape with open ends on both sides.

The housing body 21 has a front side flange portion 23, a bus bar assembly insertion portion 21a, a stator holding portion 21b, a front bearing holding portion 21c, and an oil seal holding portion 21d. The front side flange portion 23, the bus bar assembly insertion portion 21a, the stator holding portion 21b, the front bearing holding portion 21c, and the oil seal holding portion 21d are disposed in order from the rear side (+Z side) toward a front side (−Z side). That is, in the housing body 21, the front side flange portion 23 is disposed at a rearmost side and the oil seal holding portion 21d is disposed at a frontmost side. The bus bar assembly insertion portion 21a, the stator holding portion 21b, the front bearing holding portion 21c, and the oil seal holding portion 21d each has a concentric cylindrical shape. A diameter of these members are reduced in an order of the bus bar assembly insertion portion 21a, the stator holding portion 21b, the front bearing holding portion 21c, and the oil seal holding portion 21d.

The front side flange portion 23 is expanded from a rear side (+Z side) of the bus bar assembly insertion portion 21a toward a radially outer side.

The bus bar assembly insertion portion 21a encloses an end of a front side (−Z side) of the bus bar assembly 60 from the radially outer side of the center axis J. In other words, at least a portion of the end of the front side (−Z side) of the bus bar assembly 60 is disposed inside the bus bar assembly insertion portion 21a.

The stator 40 is held to the stator holding portion 21b. The front bearing holding portion 21c holds the first bearing 51. The oil seal holding portion 21d holds the oil seal 80.

The cover 22 is mounted at a rear side (+Z side) of the housing body 21. The cover 22 has a cover cylindrical shape portion 22a, a lid portion 22b, and a rear side flange portion 24.

The cover cylindrical shape portion 22a has a cylindrical shape which is open toward the front side (−Z side). The cover cylindrical shape portion 22a encloses an end portion on the rear side (+Z side) of the bus bar assembly 60 from the radially outer side. The cover cylindrical shape portion 22a is connected to an end portion on a rear side of the bus bar assembly insertion portion 21a through the front side flange portion 23 and the rear side flange portion 24.

The lid portion 22b is connected to an end portion on a rear side (+Z side) of the cover cylindrical shape portion 22a. The lid portion 22b has, for example, a plate shape. The rear side flange portion 24 is expanded from an end of a front side (−Z side) of the cover cylindrical shape portion 22a toward the radially outer side. The front side flange portion 23 and the rear side flange portion 24 are bonded to each other while overlapping with each other, such that the housing body 21 is bonded to the cover 22.

The rotor 30 has the shaft 31, a rotor core 32, and a rotor magnet 33. The shaft 31 has its center on the center axis J which extends in one direction (Z-axis direction). According to this exemplary embodiment, the shaft 31 is a cylindrical member. Further, the shaft 31 may be full and may also be a hollow cylindrical member. The shaft 31 is rotatably supported around the axis (in ±θZ direction) by means of the first bearing 51 and the second bearing 52. The end of the front side (−Z side) of the shaft 31 protrudes to the outside of the housing body 21. In the oil seal holding portion 21d, the oil seal 80 is disposed around the axis of the shaft 31.

The rotor core 32 is approximately a cylindrical member. The rotor core 32 is fixed to the shaft 31 while enclosing the shaft 31 around the axis (in the θZ direction). In more detail, the rotor core 32 has a through hole penetrating axially. At least a portion of the shaft 31 is disposed within the through hole of the rotor core 32. The shaft 31 is fixed to the rotor core 32 by, for example, a press-fit, an adhesion, or the like. According to this exemplary embodiment, the rotor magnet 33 is approximately an annular shape. Further, the shape of the rotor magnet 33 is not necessarily the annular shape. The rotor magnet 33 may be configured of a plurality of magnets which are arranged on an outer circumferential surface of the rotor core 32 in a circumferential direction.

The rotor magnet 33 is fixed to an outer side surface of the rotor core 32 along an axis circumference of the rotor core 32. The rotor core 32 and the rotor magnet 33 rotate integrally with the shaft 31.

The stator 40 is approximately a cylindrical shape. The rotor 30 is positioned inside the stator 40. In other words, the stator 40 encloses the rotor 30 around the axis (in the θZ direction). The stator 40 rotates the rotor 30 about the center axis J. The stator 40 has a core back portion 41, a plurality of teeth portions 42, a plurality of coils 43, and a plurality of bobbins 44. According to this exemplary embodiment, the core back portion 41 and the teeth portion 42 are configured of a stacked steel plate in which a plurality of electromagnetic steel plates are stacked.

A shape of the core back portion 41 is a cylindrical shape. Preferably, the shape of the core back portion 41 is concentric with the shaft 31.

The plurality of teeth portions 42 are disposed on an inner side surface of the core back portion 41. Each teeth portion 42 extends from the inner side surface of the core back portion 41 toward a radially inner side (that is, the shaft 31 side). Each teeth portion 42 is disposed at an equal interval in the circumferential direction of the inner side surface of the core back portion 41.

Preferably, the bobbin 44 is approximately a cylindrical member. Each bobbin 44 is mounted on each teeth portion 42. Preferably, the bobbin 44 is configured of at least two members engaged from an axial direction. Each coil 43 is disposed in each bobbin 44. Each coil 43 is configured by winding a conductive wire 43a. Further, as the conductive wire 43a, a circular wire or a flat wire is preferably used.

The first bearing 51 is disposed at a front side (−Z side) of the stator 40. The first bearing 51 is held by the front bearing holding portion 21c. The second bearing 52 is disposed at the rear side (+Z side) opposite to the front side (−Z side) of the stator 40. The second bearing 52 is held by a rear bearing holding portion 65 of a bus bar holder 61 which will be described later.

The first bearing 51 and the second bearing 52 supports the shaft 31 of the rotor 30. According to this exemplary embodiment, the first bearing 51 and the second bearing 52 are a ball bearing. However, the type of the first bearing 51 and the second bearing 52 is not particularly limited to the same type of bearing. Therefore, different kinds of bearings such as a sleeve bearing and a fluid hydraulic bearing may also be used. Further, the type of bearing of the first bearing 51 may be different from that of the second bearing 52.

The oil seal 80 is a substantially annular member. The oil seal 80 is mounted inside the oil seal holding portion 21d around the axis (in the θZ direction) of the shaft 31. In more detail, the oil seal 80 is disposed inside the oil seal holding portion 21d. An end of an axial lower portion of the shaft 31 penetrates through the through hole of the oil seal 80. The oils seal 80 is disposed between the oil seal holding portion 21d and the shaft 31. With this, the oil seal 80 may suppress water, oil, etc., from being infiltrated from a gap between the oil seal holding portion 21d and the shaft 31 into the housing body 21. The oil seal 80 is made of, for example, a resin material. However, a configuration and a material of the oil seal 80 are not limited thereto, and therefore an oil seal of different kinds of configurations and materials may also be used.

The motor 10 includes a bus bar holder 61 and a wiring member electrically connected to the motor body portion 11. In more detail, the bus bar assembly 60 is a unit supplying a driving current from an external power supply, etc., to the stator 40. The bus bar assembly 60 has the bus bar holder 61 and a plurality of wiring members. The plurality of wiring members are electrically connected to the motor body portion 11.

According to this exemplary embodiment, as illustrated in FIG. 3, the wiring member includes a plurality of bus bars 91a, 91b, and 91c and a plurality of circuit board connection members 92a, 92b, 92c, 92d, 92e, and 92f.

The bus bars 91a, 91b, 91c each have the same configuration, except that their installation positions are different. The circuit board connection members 92a, 92b, 92c, 92d, 92e, 92f have the same configuration, except that their installation positions are different. Therefore, in the following description, there is a case in which only the bus bar 91b and the circuit board connection member 92d are representatively described.

As illustrated in FIG. 1, the bus bar holder 61 is a holder made of resin. Preferably, a material forming the bus bar holder is an insulating resin. A rear side (+Z side) of the bus bar holder 61 is accommodated in the cover cylindrical shape portion 22a. At least a portion of a front side (−Z side) of the bus bar holder 61 is accommodated in the bus bar assembly insertion portion 21a.

As long as a material forming the bus bar holder 61 has insulation property, any material may be used without being specially limited. The bus bar holder 61 is manufactured as a single member by injection molding using, for example, a mold 83 which will be described later.

The motor 10 includes the connector portion 63. The motor body portion 11 has a convex portion 69. In more detail, the bus bar holder 61 includes a main body portion 62, the connector portion 63, a connection terminal holding portion 64, the rear bearing holding portion 65, a circuit board support portion 67, a connection portion 68, and the convex portion 69. The motor body portion 11 has the bus bar assembly 60 other than the connector portion 63.

The main body portion 62 is a cylindrical shape having an opening 62a at the rear side (+Z side) thereof and encloses the center axis J in the circumferential direction (θZ direction). The main body portion 62 encloses an end of a rear side of the rotor 30 and an end of a rear side of the stator 40 in the circumferential direction. An outer side surface of the main body portion 62 is provided with a front side O-ring holding portion 62e. A front side O-ring 81 is fitted in the front side O-ring holding portion 62e. The main body portion 62 is applied with a radially inward force from the housing body 21 to be pressed against the core back portion 41. With this, the body portion 62 is fixed to the stator 40.

A rear surface 62c of the main body portion is provided with a groove portion 62f. The groove portion 62f is provided along the contour of the main body portion 62 which encloses the opening 62a. A rear side O-ring 82 is fitted in the groove portion 62f.

The main body portion 62 has the connector connection portion 66. The connector connection portion 66 is connected to the connector portion 63 in the main body portion 62. A portion of the air hole 63c, which will be described in more detail in a subsequent section, is provided to the connector connection portion 66.

The connector portion 63 is connected to an external power supply (not illustrated). The connector portion 63 is installed at the motor body portion 11. In more detail, the connector portion 63 extends from a portion of the outer side surface of the connector connection portion 66 toward a radially outer side (+X side) of the center axis J. That is, the connector portion 63 protrudes radially outward from the motor body portion 11. According to this embodiment, the whole connector portion 63 protrudes to the outside of the housing 20.

When the connector portion 63 extends in the axial direction (Z-axis direction), there is a case in which external connection terminals 93a, 93b, 93c, which will be described later, of the bus bars 91a, 91b, 91c and the circuit board connection members 92a, 92b, 92c, 92d, 92e, 92f need to be bent within the connector connection portion 66. In this case, at the time of molding the bus bar assembly 60, the external connection terminals 93a, 93b, 93c of the bus bars 91a, 91b, 91c and the circuit board connection members 92a, 92b, 92c, 92d, 92e, 92f are likely to interfere with a mold 85b, which will be described later.

In connection with this, according to this embodiment, when the connector portion 63 extends radially outward (+X side) of the center axis J, the external connection terminals 93a, 93b, 93c of the bus bars 91a, 91b, 91c and the circuit board connection members 92a, 92b, 92c, 92d, 92e, 92f may linearly extend within the connector connection portion 66. Therefore, at the time of molding the bus bar assembly 60, the external connection terminals 93a, 93b, 93c of the bus bars 91a, 91b, 91c and the circuit board connection members 92a, 92b, 92c, 92d, 92e, 92f may be suppressed from interfering with the mold 85b, which will be described later.

As illustrated in FIG. 2, the connector portion 63 has a connector concave portion 63a which is open toward the outside of the motor body portion 11. The connector concave portion 63a has a bottom surface 63b and a side surface 63f. The bottom surface 63b is exposed to the outside of the motor body portion 11. That is, the connector portion 63 has the bottom surface 63b which is a surface exposed to the outside of the motor body portion 11. The bus bar 91b and the circuit board connection member 92d protrude radially outward from the bottom surface 63b. The side surface 63f of the connector concave portion 63a is preferably a cylindrical surface. Further, in this specification, the outside of the motor body portion 11 includes the outside of the housing 20.

The connector portion 63 is provided with the air hole 63c. The air hole 63c is a through hole and is a through hole which extends from the bottom surface 63b toward the accommodating space ARC1. According to this embodiment, the air hole 63c extends a normal direction (X-axis direction) of the bottom surface 63b. The air hole 63c passes through the connector connection portion 66 in the normal direction of the bottom surface 63b. The air hole 63c has an outside opening 63d opened in the bottom surface 63b exposed to the outside of the motor body portion 11, and an inside opening 63e opened in the accommodating space ARC1. With this, the air hole 63c allows the outside of the motor body portion 11 to be communicated with the accommodation space ARC1.

The outside opening 63d is preferably provided at a center of the bottom surface 63b. A shape of the outside opening 63d is not particularly limited, and therefore the shape of the outside opening 63d may be a circular shape, a semi-circular shape, a rectangular shape, a polygonal shape, etc. In FIG. 3, the shape of the outside opening 63d is a circular shape.

In FIG. 1, the inside opening 63e is disposed at the front side (−Z side) ahead of the circuit board 71. Although not illustrated, according to this embodiment, the shape of the inside opening 63e is, for example, a circular shape. Like the outside opening 63d, a shape of the inside opening 63e is not particularly limited, and therefore the shape of the inside opening 63e may be a circular shape, a semi-circular shape, a rectangular shape, a polygonal shape, etc.

According to this embodiment, a cross-sectional shape of the air hole 63c in a direction orthogonal to the direction in which the air hole 63c extends (X-axis direction) is identical regardless of its position. According to this embodiment, the cross-sectional shape of the air hole 63c in a direction orthogonal to the direction in which the air hole 63c extends is a circular shape.

Further, in the following description, the cross section orthogonal to the direction in which the air hole 63c extends is merely referred to as the cross section of the air hole 63c.

As illustrated in FIG. 3, when viewing the bottom surface 63b from the normal direction (X-axis direction), at least a portion of the air hole 63c is disposed inside an edge OE of an external connection terminal group 99, which will be described later. According to this embodiment, when viewing the bottom surface 63b from the normal direction, the whole air hole 63c is disposed inside the edge OE.

Further, in the following description, if the air hole is disposed at the inner side or at the outer side of the edge of the external connection terminal group when viewed in the normal direction of the bottom surface from which the external connection terminal group protrudes, it may be simply explained that the air hole is disposed at the inner side or at the outer side of the edge of the external connection terminal group.

As illustrated in FIG. 1, the connection terminal holding portion 64 holds a circuit board connection terminal 95, which will be described later. The connection terminal holding portion 64 is approximately a rectangular parallelepiped shape and protrudes toward the radial inner side from the inner side surface 62b of the main body portion 62. In more detail, the connection terminal holding portion 64 extends from the inner side surface of the connector connection portion 66 in the direction (−X direction) opposite to the direction in which the connector portion 63 extends.

The rear bearing holding portion 65 is disposed on the radial inner side of the body portion 62. The rear bearing holding portion 65 holds the second bearing 52.

At least one circuit board support portion 67 supports the circuit board 71. According to this embodiment, the plurality of circuit board support portion 67 is installed. The circuit board support portion 67 protrudes from, for example, a surface of the rear side (+Z side) of the connection portion 68 or a surface of the rear side of the rear bearing holding portion 65, toward the rear side.

At least one connection portion 68 connects the main body portion 62 to the rear bearing holding portion 65. According to this embodiment, the plurality of connection portions 68 are installed. The plurality of connection portions 68 are disposed at a circumference of the rear bearing holding portion 65 at an interval in the circumferential direction. A gap 68a is formed between the connection portions 68 adjacent to each other in the circumferential direction.

As illustrated in FIG. 2, the convex portion 69 protrudes from a surface of a front side of the connection terminal holding portion 64 toward the front side. The convex portion 69 faces the inside opening 63e. When viewing the bottom surface 63b from the normal direction (X-axis direction), the convex portion 69 completely overlaps with the inside opening 63e.

The bus bar 91b is a thin plate-like member made of a conductive material (for example, metal, etc.). As illustrated in FIG. 1, at least one bus bar 91b is electrically connected to the stator 40 to supply a driving current from the external power supply, etc., to the stator 40. The bus bar 91b has a bus bar body portion 97, the external connection terminal 93b, and a stator connection terminal 96. Similarly, as illustrated in FIG. 3, the bus bar 91a has the external connection terminal 93a. The bus bar 91c has the external connection terminal 93c.

The bus bar body portion 97 illustrated in FIG. 2 is an annular shape. (Not illustrated) The bus bar body portion 97 encloses the accommodating space ARC1 in the circumferential direction. The bus bar body portion 97 is held by the bus bar holder 61. The bus bar body portion 97 is preferably inserted into the main body portion 62.

The external connection terminal 93b linearly extends radially outward from the bus bar body portion 97. According to this embodiment, the direction in which the external connection terminal 93b extends is the normal direction (X-axis direction) of the bottom surface 63b. The external connection terminal 93b protrudes from the bottom surface 63b. In more detail, the end of the radially outer side of the external connection terminal 93b protrudes from the bottom surface 63b. With this, a portion of the external connection terminal 93b, that is, the end of the radially outer side is exposed to the outside of the motor body portion 11. The portion of the external connection terminal 93b exposed to the outside of the motor body portion 11 is connected to the external power supply, etc.

According to this exemplary embodiment, the stator connection terminal 96 is disposed to one bus bar 91 two by two. (Not illustrated) In more detail, the stator connection terminal 96 extends from one bus bar body portion 97 two by two. The bus bar has three bus bars 91a, 91b, 91c. A total of six stator connection terminals are installed.

The stator connection terminal 96 is disposed on the radial inner side of the bus bar body portion 97. The stator connection terminal 96 protrudes from the bus bar holder 61. The stator connection terminal 96 grips a coil wiring 98. The coil wiring 98 connects the coil 43 to the stator connection terminal 96 through the gap 68a. With this, the bus bar 91b is electrically connected to the stator 40. The coil wiring 98 may be a portion of the conductive wire 43a configuring the coil 43 and may be a separate member from the conductive wire 43a configuring the coil 43.

The circuit board connection member 92d is held to the bus bar holder 61 while being partially inserted thereinto. The circuit board connection member 92d electrically connects the external power supply (not illustrated) to the circuit board 71. The circuit board connection member 92d has an external connection terminal 94d. Similarly, as illustrated in FIG. 3, the circuit board connection member 92a has an external connection terminal 94a. The circuit board connection member 92b has an external connection terminal 94b. The circuit board connection member 92c has an external connection terminal 94c. The circuit board connection member 92e has an external connection terminal 94e. The circuit board connection member 92f has an external connection terminal 94f.

Each of the external connection terminals 94a to 94f has the same configuration, except that their positions are different. There is a case in which only the external connection terminal 94d is representatively described.

As illustrated in FIG. 2, the external connection terminal 94d is exposed from the bus bar holder 61. In more detail, the external connection terminal 94d protrudes from the bottom surface 63b. That is, the external connection terminal 94d is exposed to the outside of the motor body portion 11. The external connector terminal 94d is connected to the external power supply (not illustrated).

As illustrated in FIG. 1, the circuit board connection member 92d has the circuit board connection terminal 95 connected to the circuit board 71. The circuit board connection terminal 95 is exposed over the accommodating space ARC1 from the bus bar holder 61. The circuit board connection terminal 95 protrudes toward the radial inner side from an inner side surface 64a of the holding portion. The inner side surface 64a of the holding portion is an inside surface in the radial direction of the connection terminal holding portion 64. The circuit board connection terminal 95 is connected to a rear surface 71a of the circuit board of the rear side (+Z side) of the circuit board 71.

As described above, the motor 10 has a plurality of wiring members, that is, the bus bars 91a, 91b, 91c and the circuit board connection members 92a, 92b, 92c, 92d, 92e, 92f. The bus bars 91a, 91b, 91c have the external connection terminals 93a, 93b, 93c. The circuit board connection members 92a, 92b, 92c, 92d, 92e, 92f have the external connection terminals 94a to 94f. That is, the wiring member has the plurality of external connection terminals 93a, 93b, 93c and 94a to 94f.

Further, the number of all the external connection connector included in one or the plurality of wiring members may be plural. That is, the wiring member may be installed in plural and each wiring member may also have one or a plurality of external connection terminals. Only one wiring member may be installed and the wiring member may have a plurality of external connection terminals.

As illustrated in FIG. 3, the external connection terminals 93a, 93b, 93c are disposed in two lines in parallel with the external connection terminals 94a to 94f. In detail, the external connection terminals 94b to 94f of the circuit board connection members 92b to 92f are disposed in parallel along a Y-axis direction. The external connection terminal 94a of the circuit board connection member 92a are disposed in parallel with the external connection terminals 93a, 93*b*, 93*c* of the bus bars 91*a*, 91*b*, 91*c* along the Y-axis direction, at the front side (−Z side) of the external connection terminals 94*b* to 94*f*.

The external connection terminal group 99 includes a plurality of external connection terminals. The external connection terminal group 99 is configured of the external connection terminals 93*a*, 93*b*, 93*c* of the bus bars 91*a*, 91*b*, 91*c* and the external connection terminals 94*a* to 94*f* of the circuit board connection members 92*a* to 93*f*. According to this embodiment, the edge OE of the external connection terminal group 99 is a rectangular shape.

Further, when viewed in the normal direction of the surface from which the external connection terminal protrudes, the edge of the external connection terminal group may include an outline of a region having a maximum area among regions enclosed by a portion of the edges of each of the external connection terminals and a straight line connecting between the edges of each of the external connection terminals.

The control device 70 controls a driving of the motor 10. The control device 70 includes the circuit board 71, a rotating sensor 72, a sensor magnet holding member 73*a*, and a sensor magnet 73*b*. That is, the motor body portion 11 has the circuit board 71.

The circuit board 71 is disposed on an extending line of the rear side (+Z side) of the shaft 31. The circuit board 71 is disposed between the second bearing 52 and the cover 22 in the axial direction (Z-axis direction). That is, the circuit board 71 is disposed on the rear side of the second bearing 52. The circuit boar 71 is supported by the plurality of circuit board support portion 67 which is disposed inside the bus bar holder 61.

A main surface of the circuit board 71 includes a front surface 71*b* of the circuit board on the front side (−Z side) and a rear surface 71*a* of the circuit board on the rear side (+Z side). According to this embodiment, the main surface of the circuit board 71 is orthogonal to the axial direction. The rear surface 71*a* of the circuit board faces a front surface 22*c* of the cover.

At least one side of the main surface of the circuit board 71 is provided with a printed wiring (not illustrated). The rear surface 71*a* of the circuit board is connected to the circuit board connection terminal 95. The circuit board 71 outputs, for example, a motor driving signal, etc.

The sensor magnet holding member 73*a* is, for example, an annular member. A hole at a center of the sensor magnet holding member 73*a* is fitted with a small diameter of the end of the rear side (+Z side) of the shaft 31. With this, the position of the shaft 31 is determined by the sensor magnet holding member 73*a*. The sensor magnet holding member 73*a* is preferably fixed to the shaft 31 by the press-fit, the adhesion, etc. The sensor magnet holding member 73*a* may rotate along with the shaft 31.

The sensor magnet 73*b* is, for example, an annular shape. An N pole and an S pole of the sensor magnet 73*b* are alternately disposed in the circumferential direction. The sensor magnet 73*b* is fitted on an outer circumferential surface of the sensor magnet holding member 73*a*. In more detail, at least a portion of the sensor magnet 73*b* comes in contact with the outer circumferential surface of the sensor magnet holding member 73*a*. With this, the sensor magnet 73*b* is held to the sensor magnet holding member 73*a*. As a result, the sensor magnet 73*b* is disposed at the circumference (±θZ direction) of the shaft 31 at the rear side (+Z side) of the second bearing 52 so as to be able to rotate with the shaft 31. The shaft 31 is indirectly held through the sensor magnet holding member 73*a*.

The rotating sensor 72 is mounted on the front surface 71*b* of the circuit board. The rotating sensor 72 faces the sensor magnet 73*b* in the axial direction (Z-axis direction). The rotating sensor 72 detects the position of the rotor depending on a change in magnetic flux of the sensor magnet 73*b*. Although not illustrated, according to the exemplary embodiment, three rotating sensors 72 are disposed on the front surface 71*b* of the circuit board. Further, as the rotating sensor 72, for example, a hall device, etc., is used.

As illustrated in FIG. 1, the front side O-ring 81 is disposed inside the housing body 21. The front side O-ring 81 is held to the front side O-ring holding portion 62*e*. The front side O-ring 81 preferably comes in contact with the inner side surface of the housing body 21 and the outer side surface of the main body portion 62 over one round.

The rear side O-ring 82 is disposed inside the cover 22. The rear side O-ring 82 is fitted in the groove portion 62*f* of the main body portion 62. The whole circumference of the rear side O-ring 82 preferably comes in contact with the front surface 22*c* of the cover.

The configuration of the front side O-ring 81 and the rear side O-ring 82 is not limited to the above-mentioned configuration and therefore the O-ring having other configurations may also be used. According to this embodiment, the front side O-ring 81 and the rear side O-ring 82 may be preferably manufactured by, for example, machining elongated silicon rubber having a round cross section in a ring shape.

The motor 10 is connected to the external power supply through the connector portion 63. The connected external power supply is electrically connected to the bus bars 91*a*, 91*b*, 91*c* and the circuit board connection members 92*a*, 92*b*, 92*c*, 92*d*, 92*e*, 92*f*. With this, the driving current is supplied from the external power supply to the coil 43 and the rotating sensor 72 through the bus bars 91*a*, 91*b*, 91*c* and the circuit board connection members 92*a*, 92*b*, 92*c*, 92*d*, 92*e*, 92*f*. The rotating sensor 72 senses the magnetic flux of the rotor magnet. The driving current supplied to the coil 43 is controlled depending on the rotating position of the rotor 30 calculated based on, for example, the sensed magnetic flux of the rotor magnet. When the driving current is supplied to the coil 43, a magnetic field is generated in the coil 43. In other words, when the driving current is supplied to the coil 43, a torque is generated between the rotor 30 and the stator 40. With this torque, the rotor 30 having the shaft 31 rotates. By doing so, the motor 10 obtains a rotational driving force.

Figure 4:
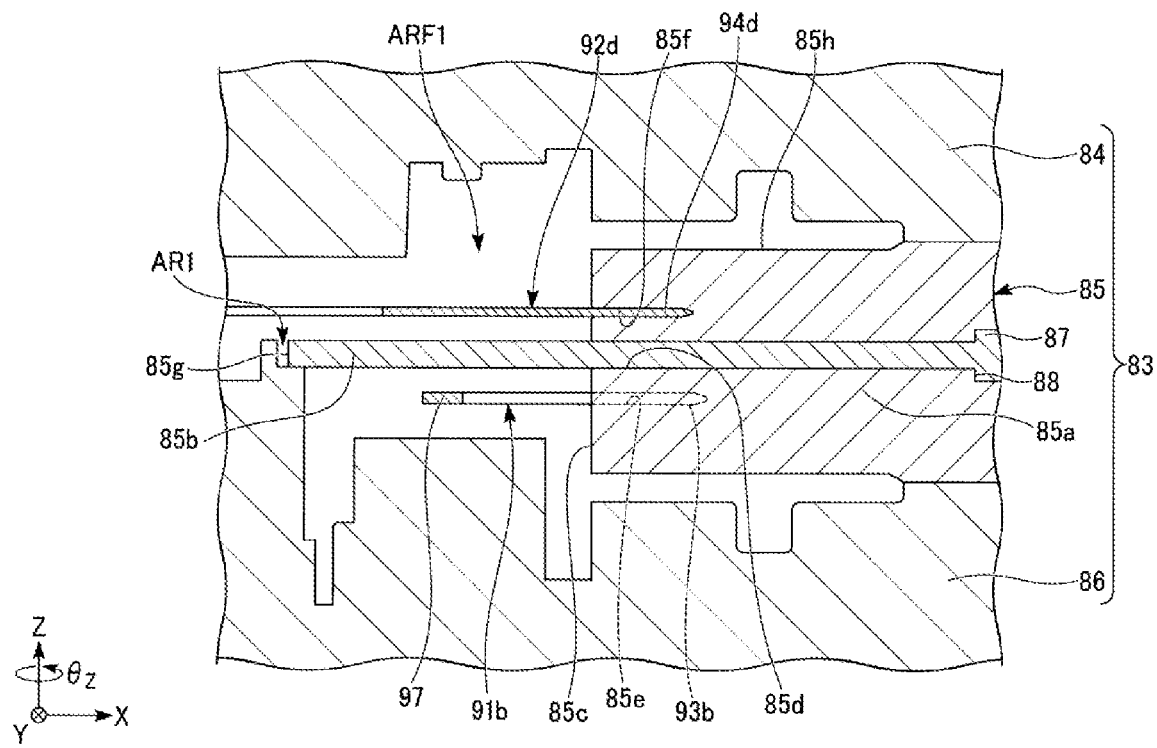
FIG. 4 is a cross-sectional view illustrating a mold for molding a bus bar assembly according to the first exemplary embodiment of the present disclosure.

Next, a method for molding the bus bar assembly 60 according to this embodiment will be described. The bus bar assembly 60 is preferably molded by insert molding using the mold 83. FIG. 4 is a cross-sectional view illustrating the mold 83 by which the bus bar assembly 60 according to this embodiment is molded. As illustrated in FIG. 4, the mold 83 has a rear side mold 84, a connector portion mold 85, and a front side mold 86.

The rear side mold 84 is a mold by which a portion of the rear side (+Z side) of the bus bar assembly 60 is molded. A surface of the front side (−Z side) of the rear side mold 84 is provided with unevenness in which the shape of the rear side of the bus bar assembly 60 is inverted.

The rear side mold 86 is a mold by which a portion of the front side (−Z side) of the bus bar assembly 60 is molded. A surface of the rear side (+Z side) of the front side mold 86 is provided with unevenness in which the shape of the front side of the bus bar assembly 60 is inverted.

The connector portion mold 85 is disposed between the rear side mold 84 and the axial direction (Z-axis direction)

of the front side mold 86. The mold 83 has a mold body portion 85*a* and a mold pin 85*b*. In other words, the connector portion mold 85 has the mold body portion 85*a* and the mold pin 85*b*.

The mold body portion 85*a* is a portion for molding the connector concave portion 63*a*. The mold body portion 85*a* preferably has the same shape as a shape of an inner space of the connector concave portion 63*a*. The shape of the mold body portion 85*a* is, for example, a cylindrical shape. A mold inner side surface 85*c* of a radial inner side of the mold body portion 85*a* molds the bottom surface 63*b*. A mold side surface 85*h* of the mold body portion 85*a* molds a side surface 63*f*.

The mold inner side surface 85*c* is provided with a mold pin insertion concave portion (concave portion) 85*d* and wiring insertion concave portions 85*e* and 85*f*. In other words, the mold body portion 85*a* has the mold pin insertion concave portion 85*d* at the mold inner side surface 85*c* orthogonal to a direction in which the mold pin 85*b* extends (X-axis direction), that is, the radial direction in this embodiment.

An end portion on a radially outer side of the mold pin 85*b* is inserted to the mold pin insertion concave portion 85*d*. The external connection terminal 93*b* of the bus bar 91*b* is inserted to the wiring insertion concave portion 85*e*. The external connection terminal 94*d* of the circuit board connection member 92*d* is inserted to the wiring insertion concave portion 85*f*. Although not illustrated in the drawings, like the bus bar 91*b*, the external connection terminals 93*a* and 93*c* of the bus bars 91*a* and 91*c* are inserted to the mold body portion 85*a*. Like the circuit board connection member 92*d*, the external connection terminals 94*a* to 94*c*, 94*e*, and 94*f* of the circuit board connection members 92*a* to 92*c*, 92*e*, and 92*f* are inserted to the mold body portion 85*a*. The mold pin insertion concave portion 85*d* has a concave diameter expansion portion 88, which has a diameter larger than that of the mold inner side surface 85*c* side (−X side), at the radially outer side, that is, at the end of the opposite side (+X side) of the mold inner side surface 85*c* in the normal direction.

The mold pin 85*b* is a portion for molding the air hole 63*c*. That is, the mold pin 85*b* has the same shape as the inner space of the air hole 63*c*. According to this embodiment, the mold pin 85*b* is a cylindrical shape extending in the normal direction (X-axis direction), that is, the radial direction, of the mold inner side surface 85*c*. The mold pin 85*b* has a mold diameter expansion portion 87, which has a diameter larger than that of the mold inner side surface 85*c* side (−X side), at the radially outer side, that is, at the end portion on the opposite side (+X side) of the mold inner side surface 85*c* in the normal direction.

The mold pin 85*b* is a separate member from the mold body portion 85*a*. The mold pin 85*b* is inserted into the mold pin insertion concave portion 85*d*. The mold pin 85*b* is inserted from the opposite side (+X side) of the mold inner side surface 85*c* in the normal direction to, for example, the mold body portion 85*a*. The mold pin diameter expansion portion 87 is fitted in the concave diameter expansion portion 88. With this, the mold pin 85*b* is not pulled out to the mold inner side surface 85*c* side (−X side). As a result, it is possible to prevent the mold pin 85*b* from falling into a molding space ARF1, which will be described later.

Although not illustrated in the drawings, the mold body portion 85*a* has a wall portion which supports the mold pin 85*b* on the radially outer side (+X side) of the mold pin diameter expansion portion 87 from the radially outer side. According to this embodiment, the wall portion may be removed. With this, the mold pin 85*b* may be removed from the mold body portion 85*a*. In the case of removing the mold pin 85*b*, for example, the wall portion supporting the mold pin 85*b* is removed and the mold pin 85*b* is pulled out radially outward (+X side). With this, the mold pin 85*b* may be removed from the mold body portion 85*a*.

The end portion on the opposite side (−X side) of the mold body portion 85*a* is supported from the front side (−Z side) by the front side mold 86. A gap AR1 is provided between an end surface 85*g* of the opposite side of the mold body portion 85*a* and the front side mold 86. That is, the end surface 85*g* is disposed separately from the front side mold 86 in the direction (X-axis direction) in which the mold pin 85*b* extends.

By combining the rear side mold 84, the connector portion mold 85, and the front side mold 86 together, the molding space ARF1 is provided inside the mold 83. Portions of the bus bars 91*a*, 91*b*, 91*c* and the circuit board connection members 92*a*, 92*b*, 92*c*, 92*d*, 92*e*, 92*f*, which are to be embedded into the bus bar holder 61, are positioned within the molding space ARF1. That is, at least a portion of each of the bus bars 91*a*, 91*b*, 91*c* and the circuit board connection members 92*a*, 92*b*, 92*c*, 92*d*, 92*e*, 92*f* is positioned within the mold 83.

In this step, a molten resin is introduced into the molding space ARF1. With this, the bus bar assembly 60, in which the bus bars 91*a*, 91*b*, 91*c* and the circuit board connection members 92*a*, 92*b*, 92*c*, 92*d*, 92*e*, 92*f* are held, is molded. That is, the connector portion 63 is molded by making resin flow into the mold 83. In more detail, the connector portion 63 is molded by insert molding in which the bus bars 91*a*, 91*b*, 91*c* and the circuit board connection members 92*a*, 92*b*, 92*c*, 92*d*, 92*e*, 92*f* are inserted into the mold 83. In this case, the convex portion 69 is molded by making a resin flowing into the gap AR1 installed between the mold pin 85*b* and the front side mold 86.

For example, in case that the mold pin 85*b* is fixed near the outer edge of the mold inner side surface 85*c*, if the mold pin insertion concave portion 85*d* is provided in the mold body portion 85*a*, the distance between the mold side surface 85*h* and the mold pin insertion concave portion 85*d* becomes closer. For this reason, a portion at which the thickness of the mold body portion 85*a* is thin is created, so that the strength of the mold body portion 85*a* may be reduced. Therefore, when the mold pin 85*b* is fixed around the outer edge of the mold inner side surface 85*c*, the mold pin 85*b* may be fixed to the mold body portion 85*a* by inserting, for example, the mold pin 85*b* into the mold side surface 85*h* and then welding the mold side surface 85*h* thereto. However, in this case, the unevenness may occur at the mold side surface 85*h* by the welding, so that the unevenness may be generated on the side 63*f* of the connector concave portion 63*a* in the molded connector portion 63. As a result, the gap is formed between the external power supply and the connector portion 63, in more detail, between the external power supply and the side surface 63*f* of the connector concave portion 63*a*, whereby the sealability may be reduced.

Meanwhile, according to this embodiment, when viewing the bottom surface 63*b* from the normal direction, at least a portion of the air hole 63*c* is installed inside the edge OE of the external connection terminal group 99. Therefore, when viewing the bottom surface 63*b* from the normal direction, the air hole 63*c* may be disposed at a position relatively spaced apart from the outer edge of the bottom surface 63*b*. With this, when in the mold body portion 85*a*, the mold pin 85*b* is positioned, that is, the mold pin insertion concave portion 85d may be disposed at a position relatively spaced apart from the outer edge of the mold inner side surface 85c. As a result, the configuration of the connector portion mold 85 for molding the connector portion 63 may be the configuration in which the mold pin 85b is inserted into the mold body portion 85a while the thickness between the mold side surface 85h and the mold pin insertion concave portion 85d is suppressed from being reduced.

As the result, since the foregoing mold pin 85b need not be welded to the mold body portion 85a, the unevenness occurring when the mold pin 85b is welded to the mold body portion 85a is not installed to the connector portion mold 85. With this, the unevenness occurring due to the welding of the metal pin 85b to the mold body portion 85a does not occur in the connector portion 63. With this, it is possible to suppress the sealability between the external power supply and the connector portion 63 from being reduced.

According to this embodiment, when viewing the bottom surface 63b from the normal direction, the whole air hole 63c is installed inside the edge OE of the external connection terminal group 99. Therefore, the position of the mold pin insertion concave portion 85d may be a position more spaced apart from the edge of the mold inner side surface 85c. With this, it is possible to more suppress the thickness between the outer side surface of the mold body portion 85a and the mold pin insertion concave portion 85d from being reduced in the configuration in which the mold pin 85b is inserted into the mold body portion 85a.

The connector portion 63 is provided with the convex portion 69 facing the inside opening 63e. Therefore, when the connector portion 63, that is, the bus bar assembly 60 is molded, the gap AR1 may be provided between an end surface 85g of the mold pin 85b and the front side mold 86. Therefore, even when a dimensional error occurs in the mold 83, there is no case in which the end surface 85g contacts the front side mold 86 when a worker assembles the connector portion mold 85 and the front side mold 86. Therefore, when the bus bar assembly 60 is molded, the worker, etc., easily assembles the mold 83.

Further, the shape of the air hole 63c is preferably a linearly extending shape as in this embodiment. The reason is that it is easy to manufacture the mold pin 85b molding the air hole 63c.

Here, when the shape of the air hole 63c is the linearly extending shape, for example, if the inside opening portion 63e of the air hole 63c is disposed at the rear side ahead of the circuit board 71, the whole connector portion 63 is more easily disposed at a rear side behind the stator 40. As the result, the size of the motor 10 is likely to be increased in the axial direction.

In connection with this, according to this embodiment, the inside opening 63e is positioned at the front side ahead of the circuit board 71. Therefore, even though the air hole 63c has a linearly extending shape, the connector portion 63 may be disposed to approach the stator 40 in the axial direction. With this, it is possible to easily manufacture the mold pin 85b molding the air hole 63c and suppress the size of the motor 10 from being increased in the axial direction.

According to this embodiment, the connector 63 is molded by making resin flow into the mold 83. Therefore, it is possible to easily manufacture the connector portion 63 and reduce manufacture costs of the connector portion 63.

According to this embodiment, the connector portion 63 is molded by insert molding inserting the wiring member, that is, the bus bar 91b and the circuit board connection member 92d into the mold 83. Therefore, the bus bar 91b and the circuit board connection member 92d may be buried into the bus bar holder 61 and the bus bar holder 61 may hold the bus bar 91b and the circuit board 92d.

Further, the mold pin 85b is a separate member from the mold body portion 85a. The mold pin 85b is inserted into the mold pin insertion concave portion 85d. Therefore, compared with the case in which the connector portion mold 85 is manufactured as a single member, the connector portion mold 85 is easily manufactured. As described above, the mold pin 85b is not fixed with the mold body portion 85a by the welding. Therefore, it is possible to suppress the sealability of the connector portion 63 from reducing.

The mold pin 85b may be removed from the mold body portion 85a. Therefore, for example, when the mold pin 85b is damaged, the mold pin 85b may be exchanged. With this, when only the mold pin 85b is damaged, the whole connector portion mold 85 need not be exchanged, and therefore costs may be reduced.

Further, the configuration according to this embodiment is not limited to the foregoing configuration.

Although the configuration that as the wiring member, three bus bars 91a, 91b, 91c and six circuit board connection members 92a, 92b, 92c, 92d, 92e, 92f are installed is described, the present disclosure is not limited thereto. When the external connection terminal is installed in plural, the number of wiring members, that is, the number of bus bars and the number of circuit board connection members in this embodiment is not particularly limited.

If the external connection terminal of the bus bar is installed in plural, the circuit board connection member may not be installed. If the external connection terminal of the circuit board connection member is installed in plural, the bus bar may not be installed. As the wiring member, if the member other than the bus bar and the member other than the circuit board connection member are installed and the member has the plurality of external connection terminals, the bus bar and the circuit board connection member may not be installed.

Each of the bus bars 91a, 91b, 91c and each of the circuit board connection members 92a, 92b, 92c, 92d, 92e, 92f is not limited to the foregoing structure and may also have the plurality of external connection terminals. In the case, as the wiring member, only one bus bar may also be installed. As the wiring member, only one circuit board connection member may also be installed.

Further, according to this embodiment, the disposition relationship between the air hole 63c and the plurality of external connection terminal is not limited to the example of FIG. 3. According to this embodiment, for example, the disposition may also be a disposition as illustrated in FIGS. 5A to 5G.

FIGS. 5A to 5G are diagrams schematically illustrating another example of the disposition relationship between the air hole 63c and the plurality of external connection terminals, that is, the air hole 63c and the external connection terminal group. In FIGS. 5A to 5G, edges of each of the external connection terminal groups are illustrated by a two dot line. FIGS. 5A to 5G are diagrams illustrating the bottom surface 63b of the connector concave portion 63a viewed in the normal direction (X-axis direction).

Figure 5A:
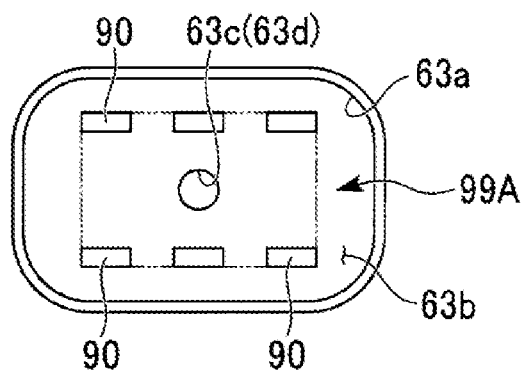
FIGS. 5A through 5G are diagrams schematically illustrating another example of a disposition relationship between an air hole and an external connection terminal group in the first exemplary embodiment of the present disclosure.
Figure 5B:
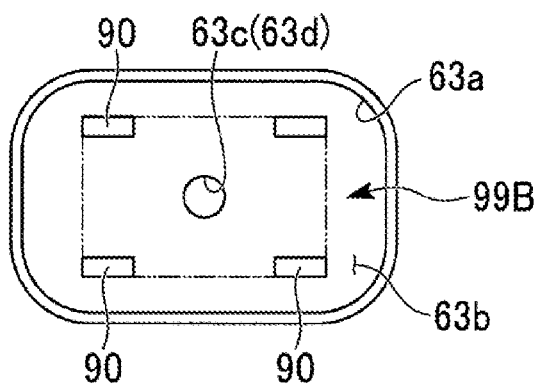
Figure 5C:
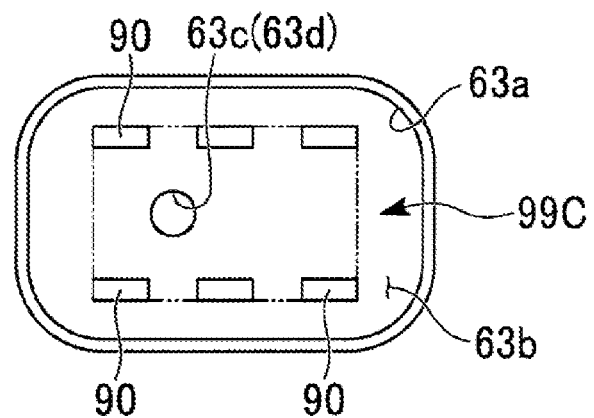
Figure 5D:
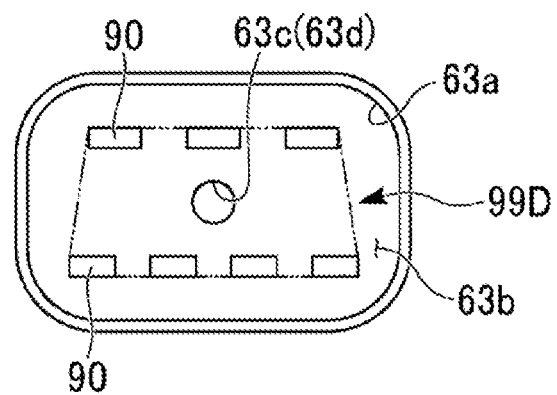
Figure 5E:
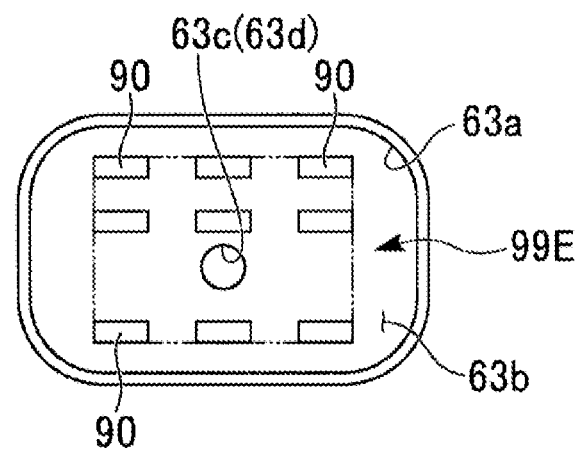
Figure 5F:
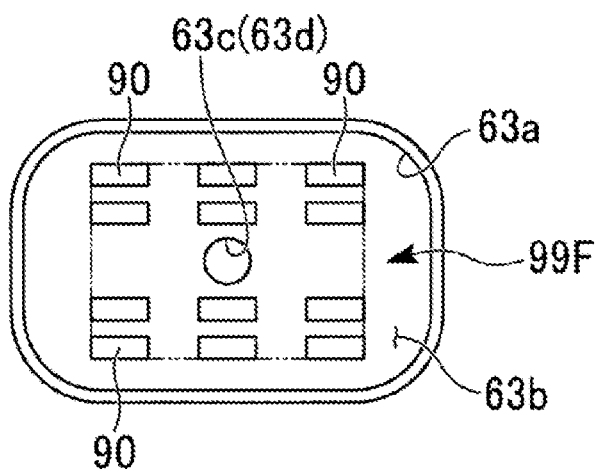
Figure 5G:
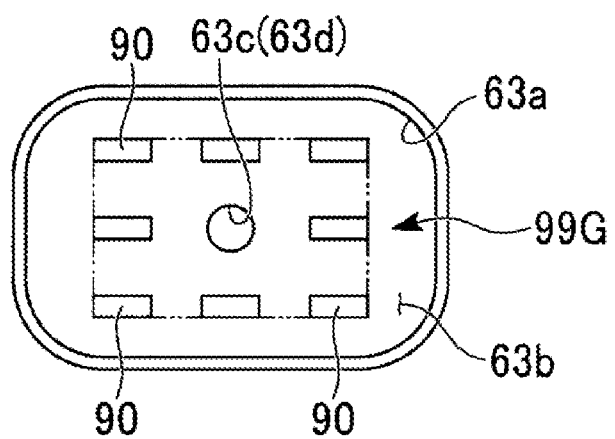

An external connection terminal group 99A illustrated in FIG. 5A is configured of six external connection terminals 90. An external connection terminal group 99B illustrated in FIG. 5B is configured of four external connection terminals 90. An external connection terminal group 99C illustrated in FIG. 5C is configured of six external connection terminals 90. An external connection terminal group 99D illustrated in FIG. 5D is configured of seven external connection terminals 90. An external connection terminal group 99E illustrated in FIG. 5E is configured of nine external connection terminals 90. An external connection terminal group 99F illustrated in FIG. 5F is configured of twelve external connection terminals 90. An external connection terminal group 99G illustrated in FIG. 5G is configured of eight external connection terminals 90.

In any example of FIGS. 5A to 5G, the whole air hole 63c is positioned inside the edge of the external connection terminal group. As illustrated in FIGS. 5C and 5E, the outside opening 63d of the air hole 63c may not be provided at the center of the bottom surface 63b. In the example of FIG. 5C, the outside opening 63d is disposed to a position deviating from the center of the bottom surface 63b toward a −Y side. In the example of FIG. 5E, the outside opening 63d is disposed to a position deviating from the center of the bottom surface 63b toward a front side (−Z side).

Further, when viewing the bottom surface 63b from the normal direction, at least a portion of the air hole 63c may be positioned inside the edge OE of the external connection terminal group 99. That is, a portion of the air hole 63c may be positioned inside the edge OE.

When a portion of the air hole 63c is positioned inside the edge OE, only a portion of the whole cross section of the air hole 63c may also be positioned inside the edge OE. When a portion of the air hole 63c is positioned inside the edge OE, the whole cross section of the air hole 63c may be a cross section positioned outside the edge and at a portion of the cross section of the air hole 63c may also be a cross section positioned inside the edge OE.

At least a portion of the outside opening 63d may be positioned inside the edge OE. In this case, a portion other than the outside opening 63d may be positioned outside the edge OE.

The air hole 63c may be, for example, a curvilinearly extending shape and a shape in which at least a portion is bent.

The connector portion 63 may extend from the motor body portion 11 toward the rear side or the front side in the axial direction and in other directions.

The convex portion 69 may not necessarily be installed. The circuit board 71 may not necessarily be installed.

A second exemplary embodiment describes using an air hole having a different shape from that of the first exemplary embodiment. In the following description, the same components as the first exemplary embodiment are denoted with the same reference numbers and therefore the description of thereof may be omitted.

Figure 6:
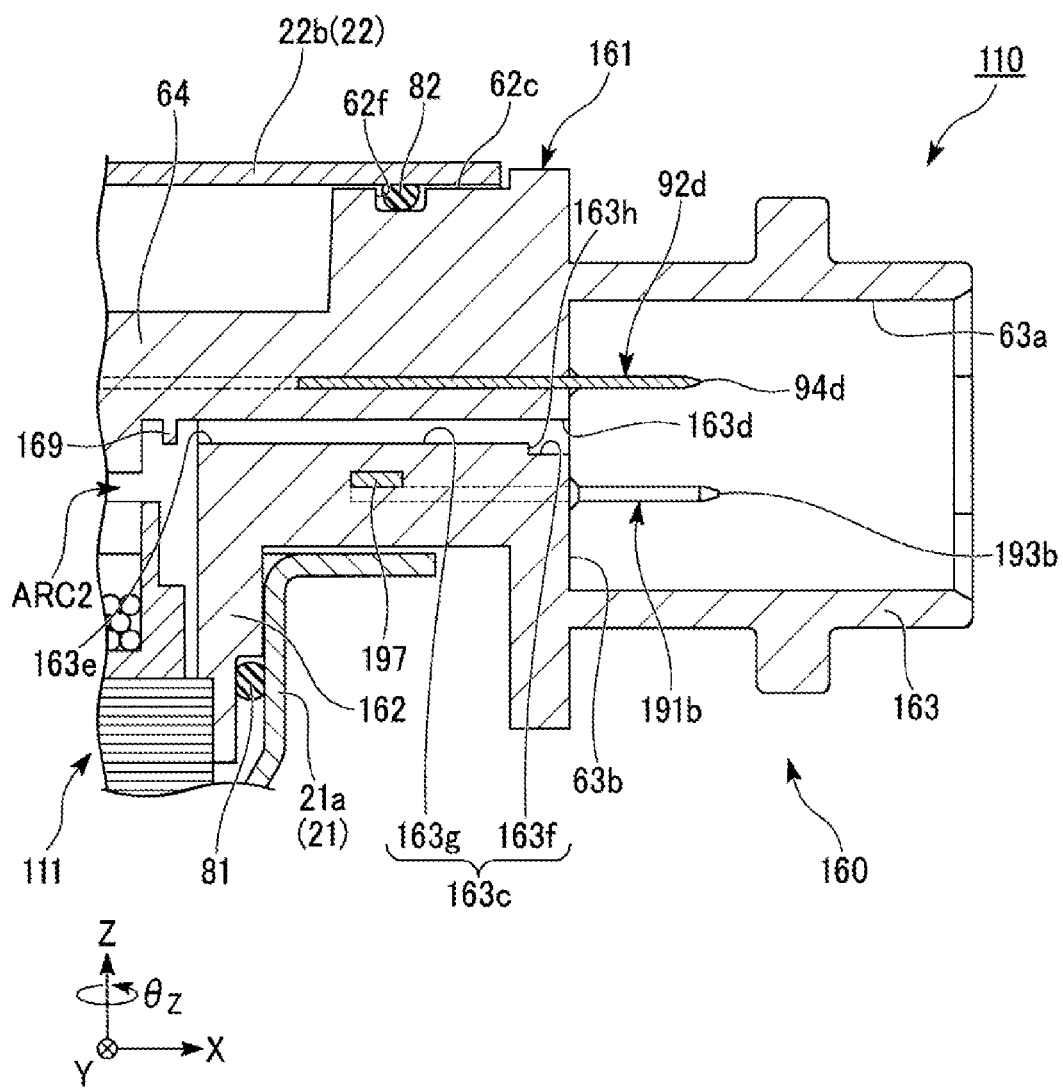
FIG. 6 is a diagram illustrating a connector portion according to a second exemplary embodiment of the present disclosure.

FIG. 6 is a cross-sectional view illustrating a portion of a motor 110 according to the second exemplary embodiment. As illustrated in FIG. 6, the motor 110 includes a seal member 160. The bus bar assembly 160 includes a bus bar holder 161 and a plurality of wiring members electrically connected to the motor body portion 111. The motor body portion 111 is a portion other than a connector portion 163 of the bus bar assembly 160 to be described below.

The plurality of wiring members include a circuit board connection board 92d and a bus bar 191b. Although not illustrated, similar to the first exemplary embodiment, six circuit board connection members are installed. Three bus bars are installed.

The bus bar 191b has a bus bar body portion 197 and an external connection terminal 193b. A structure of the bus bar body portion 197 has the same structure as the bus bar body portion 97 according to the first embodiment and therefore the description thereof will be omitted. The external connection terminal 193b is connected to a front side (−Z side) of the bus bar body portion 197. The external connection terminal 193b linearly extends from the bus bar body portion 197 toward a radially outer side. The external connection terminal 193b protrudes from the bottom surface 63b. Other configurations of the bus bar 191b have the same configuration as the bus bar 91b and therefore the description thereof will be omitted.

The bus bar holder 161 has a body portion 162, a connector portion 163, and a convex portion 169. A structure of the body portion 162 has the same structure as the body portion 162 according to the first embodiment and therefore the description thereof will be omitted.

The connector portion 163 is different from the connector portion 63 according to the first embodiment in a shape of the air hole 163c. The air hole 163c has a base portion 163f and a narrow width portion 163g.

A base portion 163f has an outside opening 163d opened at an outside of the motor body portion 111. The outside opening 163d is the same as the outside opening 63d according to the first embodiment and therefore the description thereof will be omitted. A cross section shape of the base portion 163f is, for example, a circular shape. Further, a cross section shape of the base portion 163f is the same as the air hole 63c according to the first embodiment and therefore is not particularly limited. According to this embodiment, the base portion 163f extends in the normal direction (X-axis direction) of the bottom surface 63b, that is, the radial direction.

The narrow width portion 163g is connected to an accommodating space ARC2 side (−X side) of the base portion 163f, that is, an end of an inner side of the radial direction. The narrow width portion 163g extends in the normal direction (X-axis direction) of the bottom surface 63b, that is, the radial direction. A cross sectional area of the narrow width portion 163g is smaller than an opened area of the air hole 163c in the bottom surface 63b. In other words, an area of a cross section orthogonal to the direction in which the narrow width portion 163g extends is smaller than an area of the outside opening 163d. According to the exemplary embodiment, a cross section shape of the narrow width portion 163g is a semi-circular shape. Further, the cross section shape of the narrow width portion 163g is not particularly limited. The narrow width portion 163g has an inside opening 163e opened in the accommodating space ARC2.

In the axial direction (Z-axis direction), a position of an end of a rear side (+Z side) of the narrow width portion 163g is the same as a position of an end of a rear side of the base portion 163f. With this, a front size (−Z side) of a connected portion between the base portion 163f and the narrow width portion 163g is provided with a stepped portion 163h. The stepped portion 163h is a step protruding from the front side toward the rear side while it arrives from the outside opening 163d to the inside opening 163e.

The convex portion 169 faces the inside opening 163e. The convex portion 169 is the same as the convex portion 69 according to the first embodiment and therefore the description thereof will be omitted. Other configurations of the motor 110 are the same as those of the motor 10 according to the first embodiment.

Figure 7:
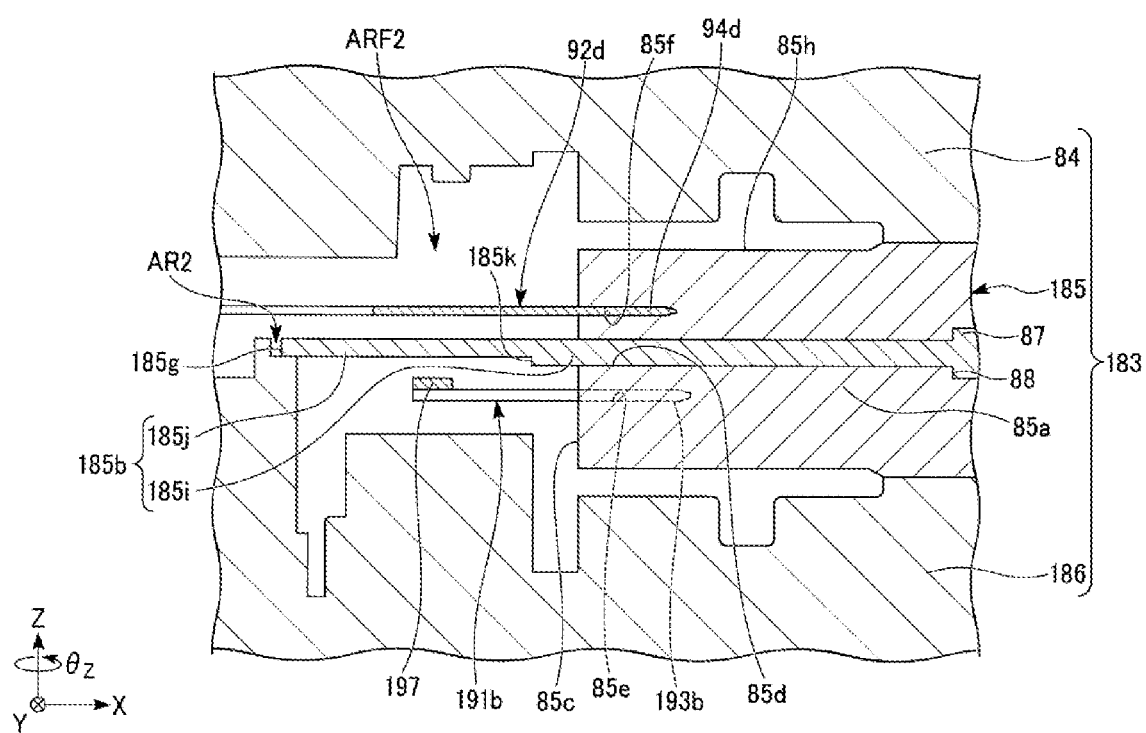
FIG. 7 is a cross-sectional view illustrating a mold for molding a bus bar assembly according to the second exemplary embodiment of the present disclosure.

Next, a method for molding the bus bar assembly 160 according to this embodiment will be described. The bus bar assembly 160 is molded by molding using a mold 183. FIG. 7 is a cross-sectional view illustrating the mold 183 by which the bus bar assembly 160 according to this embodiment is molded.

As illustrated in FIG. 7, the mold 183 has the rear side mold 84, a connector portion mold 185, and a front side mold 186. A structure of the front side mold 186 is the same as that of the front side mold 86 according to the first embodiment. By combining among the rear side mold 84, the connector portion mold 185, and the front side mold 186, the molding space ARF2 is provided.

The connector portion mold 185 has the mold body portion 85a and a mold pin 185b. The mold pin 185b is a portion molding an air hole 163c. That is, the mold pin 185b has the same shape as an inner space of the air hole 163c. The mold pin 185b has a pin base portion 185i and a pin narrow width portion 185j.

The pin base portion 185i is inserted into the mold pin insertion concave portion 85d of the mold body portion 85a. A portion exposed to the molding space ARF2 in the pin base portion 185i is a portion molding the base portion 163f. The pin base portion 185i is preferably a cylindrical shape in which it extends in the normal direction (X-axis direction) of the mold inner side surface 85c.

The pin narrow width portion 185j is bonded to the end of the opposite side (−X side) to the mold body portion 85a of the pin base portion 185i. The pin narrow width portion 185j is a portion molding the narrow width portion 163g. A cross sectional area of the pin narrow width portion 185j is smaller than that of the pin base part 185i. The pin narrow width portion 185j is a semi-cylindrical shape in which it extends in the normal direction (X-axis direction) of the mold inner side surface 85c. A gap AR2 is installed between the end surface 185g and the front side mold 186.

In the axial direction (Z-axis direction), a position of an end of a rear side (+Z side) of the pin narrow width portion 185j is the same as a position of an end of a rear side of the pin base portion 185i. With this, the front side (−Z side) of the bonded portion between the pin base portion 185i and the pin narrow width portion 185j is provided with a stepped portion 185k. The stepped portion 185k is a step concaved toward the rear side while it arrives from the pin base portion 185i to the pin narrow width portion 185j. Other configurations of the mold pin 185b are the same as that of the mold pin 85b according to the first embodiment.

Similar to the first embodiment, the molten resin flows into the molding space ARF2 in the state in which the bus bar 191b and the circuit board connection member 92d are inserted into the molding space ARF2 to be solidified, such that the bus bar assembly 160 is molded. The resin flows into the gap AR2 installed between the connector portion mold 185 and the front side mold 186 to be solidified, such that the block portion 169 is molded.

Here, there is a case in which a portion of the bus bar is positioned at a side provided with the air hole rather than at a portion exposed to the outside of the motor body part. In detail, as illustrated in FIG. 6, there is a case in which the bus bar body portion 197 is disposed on the rear side behind the external connection terminal 193d. In this case, when the bus bar assembly is formed by the insert molding, a portion of the bus bar is disposed to a position close to the mold pin. In this case, when a portion of the bus bar contacts the mold pin, in the molded connector part, there is a problem in that a portion of the bus bar may be exposed to the air hole. Further, even when a portion of the bus bar does not contact the mold pin, if the gap between a portion of the bus bar and the mold pin is reduced, the resin is hard to flow into the gap between a portion of the bus bar and the mold pin, such that a portion of the bus bar is likely to be exposed to the air hole.

In connection with this, according to this embodiment, the air hole 163c has the narrow width portion 163g. Therefore, as illustrated in FIG. 7, the connector portion 163 may be molded by using the mold pin 185b having the pin narrow width portion 185j. With this, in FIG. 7, the gap between the bus bar body portion 197 and the mold pin 185b, that is, the bus bar body portion 197 and the pin narrow width portion 185j may be large, such that the bus bar 191b may be suppressed from being exposed to the air hole 163c. Further, the circuit board connection member 92d may obtain the same effect.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A motor, comprising:
   a motor body portion comprising:
   a rotor having a shaft which has a center on a center axis extending in one direction;
   a stator enclosing the rotor and structured to rotate the rotor about the center axis;
   a first bearing which is disposed at a first side in the one direction of the stator and supports the shaft;
   a second bearing which is disposed at a second side opposite to the first side of the stator and supports the shaft; and
   a housing having an accommodating space for accommodating the rotor, the stator, the first bearing, and the second bearing;
   a connector portion disposed to the motor body portion; and
   a wiring member electrically connected to the motor body portion,
   wherein the connector portion has an exposed surface which is exposed to an outside of the motor body portion,
   the wiring member includes a plurality of external connection terminals which are connected to an external power supply and protrude from the exposed surface of the connector portion,
   the connector portion is provided with a through hole which extends from the exposed surface toward the accommodating space and allows the outside of the motor body portion and the accommodating space to be communicated with each other,
   when viewing the exposed surface from a normal direction, at least a portion of the through hole is positioned inside an outer edge of an external connection terminal group configured of the plurality of external connection terminals;
   a cross-sectional shape of the through hole in a direction orthogonal to a direction in which the through hole extends is different from a cross-sectional shape of the external connection terminal.

2. The motor of claim 1,
wherein when viewing the exposed surface from the normal direction, the whole through hole is positioned inside the outer edge of the external connection terminal group.

3. The motor of claim 1,
wherein the through hole has a narrow width portion disposed on the motor body portion side of the connector portion, and
a cross-sectional area of the narrow width portion is smaller than an opened area of the through hole in the exposed surface.

4. The motor of claim 1,
wherein the through hole has an inside opening opened in the accommodating space, and the motor body portion has a convex portion facing the inside opening.

5. The motor of claim 1,
wherein the motor body portion has a circuit board disposed on the second side behind the second bearing,
the through hole has an inside opening which is open toward the accommodating space, and
the inside opening is positioned closer to the first side than the circuit board in a direction of the center axis.

6. The motor of claim 1,
wherein the connector portion is molded by making resin flow into a mold.

7. The motor of claim 6,
wherein the connector portion is formed by insert molding and inserting the wiring member into the mold.

8. The motor of claim 6,
wherein the mold has a mold pin molding a mold body portion and the through hole,
the mold pin is a separate member from the mold body portion,
the mold body portion has a concave portion at a surface orthogonal to a direction in which the mold pin extends, and
the mold pin is inserted into the concave portion.

9. The motor of claim 8,
wherein the mold pin is removed from the mold body portion.

* * * * *